United States Patent
Huang et al.

(10) Patent No.: US 12,142,084 B2
(45) Date of Patent: Nov. 12, 2024

(54) APPARATUS AND METHODS FOR SPOOFING DETECTION USING MACHINE LEARNING PROCESSES

(71) Applicant: QUALCOMM INCORPORATED, San Diego, CA (US)

(72) Inventors: Chun-Ting Huang, San Diego, CA (US); Lei Wang, San Diego, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 17/561,309

(22) Filed: Dec. 23, 2021

(65) Prior Publication Data
US 2023/0206698 A1    Jun. 29, 2023

(51) Int. Cl.
*G06V 40/40* (2022.01)
*G06V 10/82* (2022.01)
*G06V 40/16* (2022.01)

(52) U.S. Cl.
CPC .............. *G06V 40/40* (2022.01); *G06V 10/82* (2022.01); *G06V 40/16* (2022.01)

(58) Field of Classification Search
CPC ........ G06V 40/40; G06V 10/82; G06V 40/16; G06V 10/454; G06V 40/172;
(Continued)

(56) References Cited

U.S. PATENT DOCUMENTS

| 8,984,622 B1 * | 3/2015 | Baldwin | G06V 40/162 |
| | | | 726/16 |
| 2003/0021448 A1 * | 1/2003 | Chen | G06V 40/18 |
| | | | 382/117 |

(Continued)

FOREIGN PATENT DOCUMENTS

WO    WO-2019152983 A2 *   8/2019

OTHER PUBLICATIONS

Clover J., "iOS 15 Includes Improved Face ID Anti-Spoofing Models and Other Vulnerability Fixes", MacRumors, Sep. 20, 2021, pp. 1-6, Retrieved from: https://www.macrumors.com/2021/09/20/ios-15-improved-face-id-anti-spoofing/ [Dec. 28, 2021].

(Continued)

*Primary Examiner* — Nimesh Patel
(74) *Attorney, Agent, or Firm* — QUALCOMM Incorporated

(57) ABSTRACT

Methods, systems, and apparatuses are provided to automatically determine whether an image is spoofed. For example, a computing device may obtain an image, and may execute a trained convolutional neural network to ingest elements of the image. Further, and based on the ingested elements of the image, the executed trained convolutional neural network generates an output map that includes a plurality of intensity values. In some examples, the trained convolutional neural network includes a plurality of down sampling layers, a plurality of up sampling layers, and a plurality of joint spatial and channel attention layers. Further, the computing device may determine whether the image is spoofed based on the plurality of intensity values. The computing device may also generate output data based on the determination of whether the image is spoofed, and may store the output data within a data repository.

20 Claims, 8 Drawing Sheets

(58) Field of Classification Search
CPC .. G06V 20/695; G06V 10/235; G06V 10/993; G06V 20/52; G06V 10/70; G06V 10/764; G06V 20/64; G06V 40/161; G06V 40/174; G06V 40/167; G06V 10/40; G06V 10/10; G06V 10/761; G06V 10/60; G06V 2201/06; G06V 40/10; G06V 40/1353; G06V 40/1365; G06V 40/1347; G06V 40/13; G06V 40/1388; G06V 40/1371; G06V 40/176; G06V 40/171; G06V 40/18; G06V 40/197; G06V 40/193; G06V 40/20; G06V 40/70; G06T 2207/10016; G06T 7/0004; G06T 7/11; G06T 2207/20081; G06T 2207/20084; G06T 7/73; G06T 2207/30168; G06T 2207/30232

See application file for complete search history.

(56) References Cited

U.S. PATENT DOCUMENTS

2014/0219517 A1* 8/2014 Mishra ............... G06V 10/764
                                                        382/118
2019/0347388 A1* 11/2019 Jiang ................... G06V 10/82
2020/0218878 A1* 7/2020 Mequanint ........... G08B 21/182

OTHER PUBLICATIONS

Coleman A., "Deepfake' App Causes Fraud and Privacy Fears in China", BBC Monitoring, Sep. 4, 2019, pp. 1-8, Retrieved from: https://www.bbc.com/news/technology-49570418 [Dec. 28, 2021].

Feng H., et al., "Learning Generalized Spoof Cues for Face Anti-spoofing", arXiv:2005.03922v1 [cs.CV], May 8, 2020, pp. 1-16.

International Search Report and Written Opinion—PCT/US2022/081294—ISA/EPO—Mar. 31, 2023.

Paik C.K., et al., "More than Just an Auxiliary Loss: Anti-Spoofing Backbone Training via Adversarial Pseudo-Depth Generation", arxiv.org, Cornell University Library, 201 Olin Library Cornell University Ithaca, NY 14853, Jan. 2021, XP081851179, 10 pages, abstract section "3. 2. Pseudo-Depth GAN", p. 2, figure 2.

Singh A., et al., "FDSNet: Finger Dorsal Image Spoof Detection Network using Light Field Camera", 2019 IEEE 5th International Conference on Identity, Security, and Behavior Analysis (ISBA), Jan. 22, 2019, XP033584743, 9 pages, abstract section "FDSNet—Basic architecture detail", p. 2, left-hand col. figure 2.

* cited by examiner

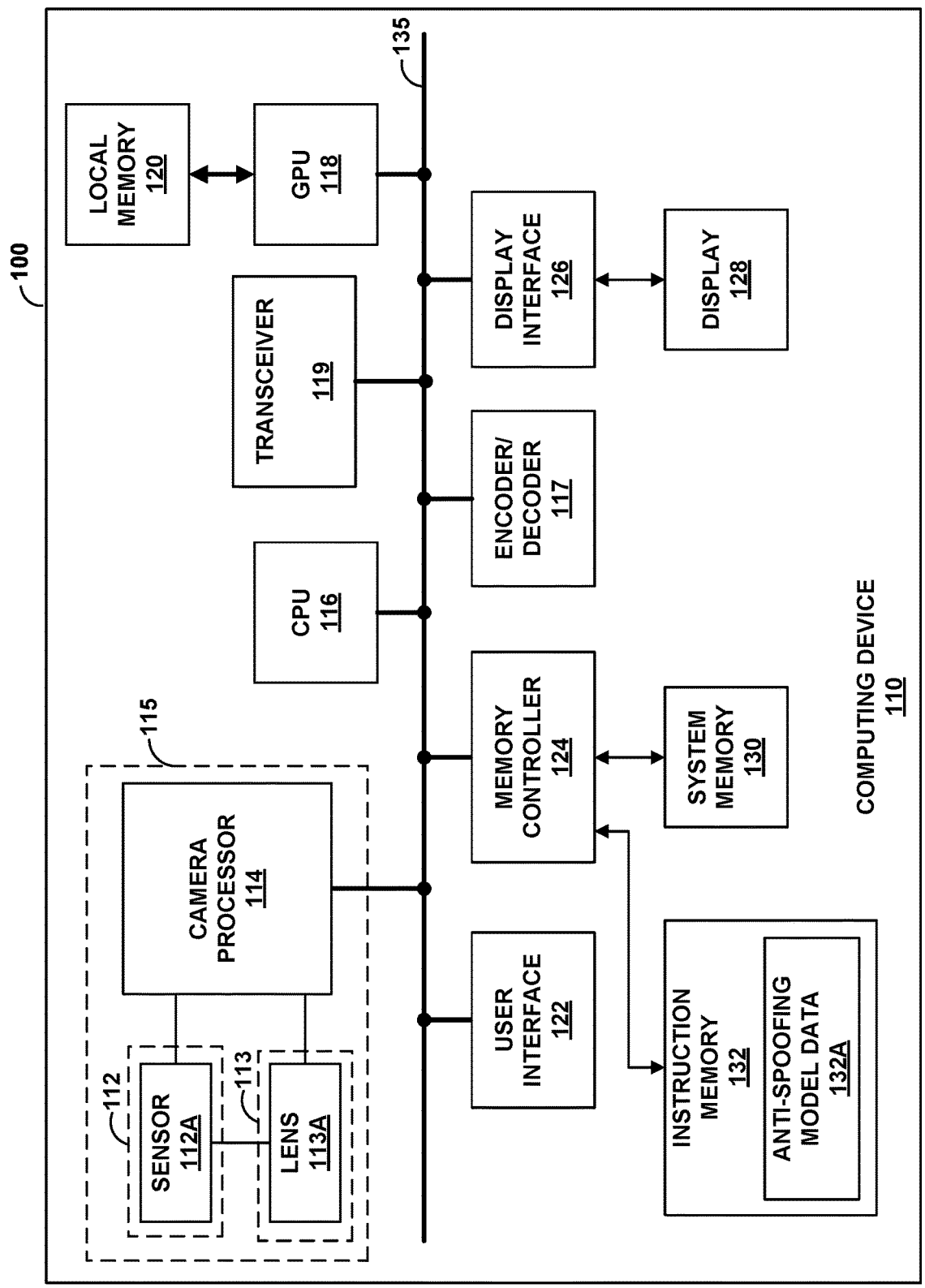

APPARATUS AND METHODS FOR SPOOFING DETECTION USING MACHINE LEARNING PROCESSES

BACKGROUND

Field of the Disclosure

This disclosure relates generally to spoofing detection and, more specifically, to detecting spoofing within captured images using machine learning processes.

Description of Related Art

Image capture devices, such as phones, tablets, and smart devices, may capture images and detect objects within those images for a variety of applications. For example, image capture devices can include facial detection technology that allows the image capture device to identify faces in a field-of-view of a camera's lens. Further, facial recognition technology can verify and authenticate the identified face as a particular person. For example, upon verifying the identified face as a particular user, a system with facial recognition technology may grant access to the user. For instance, the user may gain access to a device, an online account, a portal, a security vault, or any other secured hardware or software. In some instances, however, a bad actor may initiate a face spoofing attack in an attempt to spoof these facial recognition processes. Example spoofing methods include, for example, the use of printed photos, face cutouts, digital images and videos, and 3D printed masks, among others. These face spoofing attacks present, among other things, security issues.

SUMMARY

According to one aspect, a method includes obtaining image data. The method also includes applying a trained machine learning process to the image data to generate an output map comprising intensity values. Further, the method includes determining whether the image data depicts an unauthentic object based on the intensity values. The method also includes generating, based on the determination, output data characterizing whether the image data depicts the unauthentic object.

According to another aspect, an apparatus comprises a non-transitory, machine-readable storage medium storing instructions, and at least one processor coupled to the non-transitory, machine-readable storage medium. The at least one processor is configured to obtain image data. The at least one processor is also configured to apply a trained machine learning process to the image data to generate an output map comprising intensity values. Further, the at least one processor is configured to determine whether the image data depicts an unauthentic object based on the intensity values. The at least one processor is also configured to generate, based on the determination, output data characterizing whether the image data depicts the unauthentic object.

According to another aspect, a non-transitory, machine-readable storage medium stores instructions that, when executed by at least one processor, causes the at least one processor to perform operations that include obtaining image data. The operations also include applying a trained machine learning process to the image data to generate an output map comprising intensity values. Further, the operations include determining whether the image data depicts an unauthentic object based on the intensity values. The operations also include generating, based on the determination, output data characterizing whether the image data depicts the unauthentic object.

According to another aspect, an image capture device includes: a means for obtaining image data; a means for applying a trained machine learning process to the image data to generate an output map comprising intensity values; a means for determining whether the image data depicts an unauthentic object based on the intensity values; and a means for generating, based on the determination, output data characterizing whether the image data depicts an unauthentic object.

BRIEF DESCRIPTION OF DRAWINGS

FIG. 1 is a block diagram of an exemplary image spoofing detection device, according to some implementations;

DETAILED DESCRIPTION

Figure 2A:
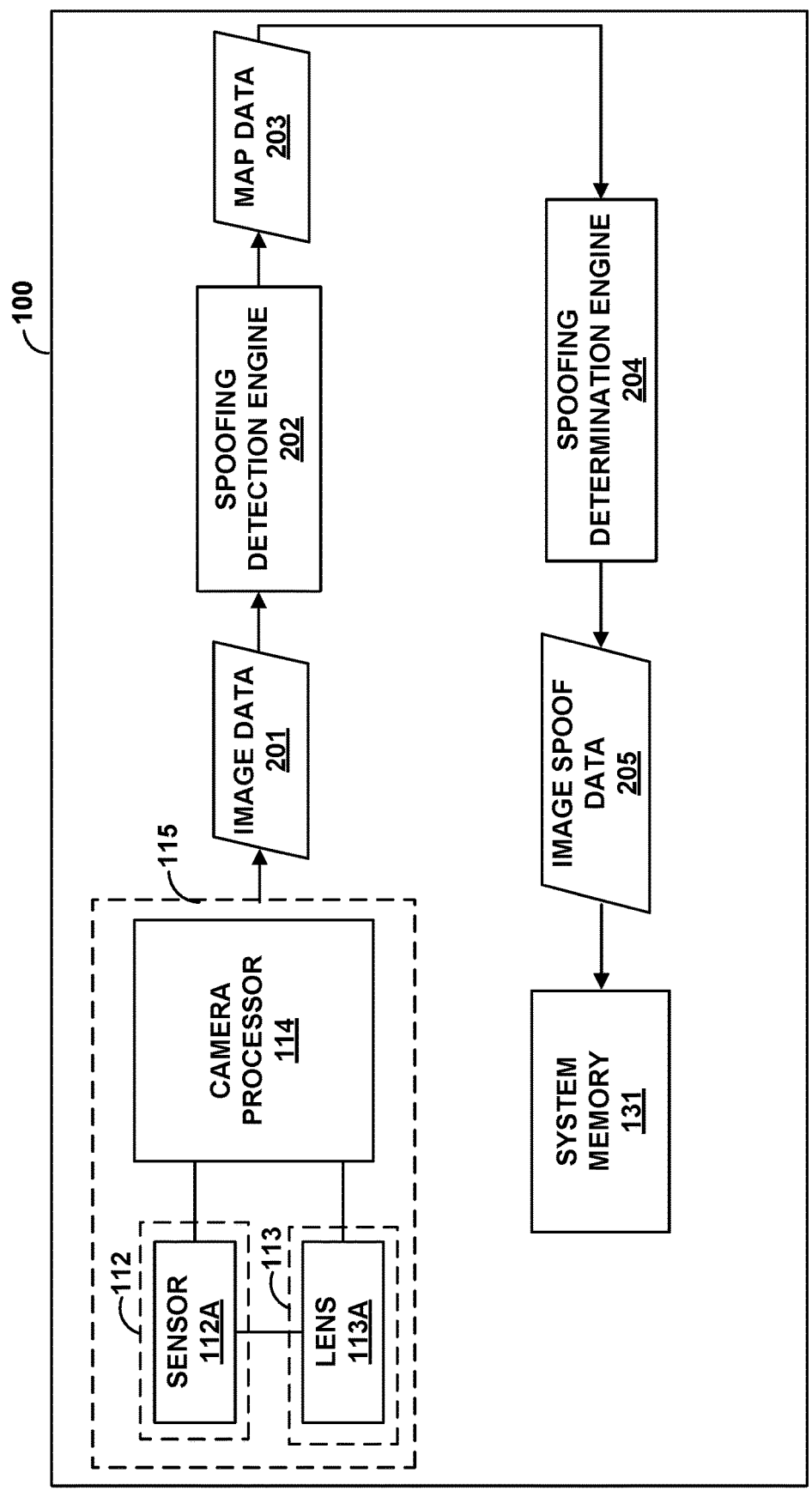
FIGS. 2A, 2B, 2C, 3A, and 3B are block diagrams illustrating portions of an exemplary image spoofing detection device, according to some implementations.

While the features, methods, devices, and systems described herein may be embodied in various forms, some exemplary and non-limiting embodiments are shown in the drawings, and are described below. Some of the components described in this disclosure are optional, and some implementations may include additional, different, or fewer components from those expressly described in this disclosure.

Various systems, such as biometric authentication systems, rely on facial recognition technology to, for example, authenticate users. For example, imaging devices, such as digital cameras, smartphones, tablet computers, laptop computers, automobiles, or Internet-of-things (IoT) devices (e.g., security cameras, etc.), may capture a person's image, and may perform one or more facial recognition processes to authenticate a face. In other examples, virtual reality (VR) or augmented reality (AR) devices may apply facial recognition processes to captured images to authenticate a user, such as a gamer. Bad actors such as "hackers," however, may try and gain unauthorized access by attempting to spoof facial recognition systems with different presentation attacks. These presentation attacks can include, for example, the use of printed photos, face cutouts, digital images or videos, or 3D facial masks. As such, many authentication applications can benefit from spoof detection, such as to identify and prevent access to unauthorized users.

In some implementations, an image capture device may include one or more optical elements, such as an assembly of one or more lenses (e.g., a lens assembly) that focus incident light onto an imaging sensor disposed at a corresponding imaging plane (e.g., an array of sensing elements formed within a semiconductor substrate). The imaging assemblies may also include a shutter that, when open, allows the incident light to reach sensing elements of the imaging sensor. Each of the sensing elements may collect incident light and generate an electrical signal, which characterizes and measures a value of a luminance of the incident light and, further, a chrominance of the incident light. For example, each of the sensing elements may include color-filtered photodiodes, e.g., to establish red, green, and blue (RGB) color channels. The image sensor may use various capture modes under various circumstances to capture frames of image data, such as video data or still images (e.g., snapshots).

Further, the image capture device may include one or more processors that apply a trained machine learning process, such as the trained convolutional neural network (CNN) described herein (i.e., the anti-spoofing model), to a captured image to detect whether the image depicts an unauthentic object (e.g., whether the object is spoofed). The one or more processors may include, for example, a camera processor, a central processing unit (CPU), a graphical processing unit (GPU), a digital signal processor (DSP), or a neural processing unit (NPU). For example, and based on the execution of instructions stored in non-volatile memory, the one or more processors may apply the trained CNN to a captured image to generate and output map data that includes a plurality of intensity values. Each intensity value may fall within a range, such as within 0 and 255 for an 8-bit intensity value. In some examples, the map data includes an intensity value for each pixel of the captured image. Based on the intensity values, the one or more processors may determine whether the captured image depicts an unauthentic object. For example, the one or more processors may sum the intensity values to determine a total intensity value, and determine whether the total intensity value is beyond (e.g., above) a threshold. If the total intensity value is, for example, beyond the threshold, the one or more processors may determine that the captured image includes an unauthentic object (e.g., a bad actor is attempting to access a system). Further, and in some examples, the one or more processors may identify a "spoofed area" of the captured image (e.g., an area of the captured image that includes the unauthentic object) based on the intensity values.

In some embodiments, the trained CNN includes a plurality of down sampling layers, a plurality of up sampling layers, and a plurality of joint spatial and channel attention layers. As described herein, each of the plurality of down sampling layers may be followed by a joint spatial and channel attention layer. Similarly, each of the plurality of up sampling layers may be followed by a joint spatial and channel attention layer. The one or more processor may execute the trained CNN to, for example, ingest elements of a captured image, and generate elements of output map data comprising the intensity values.

Further, the CNN may be trained with un-spoofed images (e.g., images with no unauthentic objects) and spoofed images (e.g., images with an unauthentic object), and that may be labelled as such (e.g., using supervised learning processes). For example, the one or more processors may execute the untrained CNN to ingest the un-spoofed and spoofed images (e.g., ground truth image data), along with their corresponding labels, for training. Further, and during training, an auxiliary image classifier, such as a pre-trained CNN (e.g., ResNet) image classifier, may be employed to determine when the untrained CNN has converged (e.g., has been sufficiently trained). For example, the auxiliary image classifier may receive as an input the map data from, and the input image (e.g., the un-spoofed and spoofed images) to, the CNN being trained (e.g., as the CNN is being trained). The auxiliary image classifier may determine when the untrained CNN has converged, and may also serve as a guiding tool to provide ground truth feedbacks to amplify spoof responses in generated output map data. The one or more processors may execute the auxiliary image classifier to generate output data characterizing a loss between the map data and the input image.

Further, the one or more processors may determine one or more losses based on the output data generated from the executed the auxiliary image classifier to determine when the in-training CNN has converged. For example, the one or more processors may determine one or more of a triplet loss, a regression loss, and a classification loss (e.g., cross-entropy loss), among others. The one or more processors may further determine whether one or more of the computed losses satisfy a corresponding threshold to determine whether the in-training CNN has converged. For example, the one or more processors may determine the in-training CNN has converged, and thus is trained, when a computed regression loss meets or exceeds a first pre-determined threshold, when a computed triplet loss meets or exceeds a second pre-determined threshold, and when a computed classification loss meets or exceeds a third pre-determined threshold.

In other examples, the one or more processors may apply an initially trained CNN to a validation set (e.g., a validation set of images), and may determine whether the initially trained CNN is sufficiently trained based on the map data generated during the validation. For example, the one or more processors may compute one or more losses as described herein based on the input images and the map data generated by the executed CNN during the validation. If the computed losses indicate that the CNN is not sufficiently trained (e.g., the one or more computed losses do not meet their corresponding thresholds), the one or more processors continue training the CNN (e.g., with additional training images).

When training is complete, the one or more processors store values for configuration parameters, hyperparameters, and/or weights associated with the trained CNN in a data repository. The stored values for the configuration parameters, hyperparameters, and/or weights allow the one or more processors to configure the CNN (e.g., the trained CNN) for use during inference. For example, the one or more processors may obtain the configuration parameters, hyperparameters, and/or weights from the data repository, and may configure the CNN with the obtained configuration parameters, hyperparameters, and/or weights for (e.g., real-time) execution during inference.

Among other advantages, the embodiments described herein may allow for image spoofing detection, for example, by identifying an image with an unauthorized object, such as a spoofed face. Further, the embodiments described herein may require less processing power requirements than conventional systems, as during inference the auxiliary classifier is not employed. Moreover, the embodiments described herein may be applied across a variety of applications that include biometric or facial recognition technologies, such as in applications that rely on these technologies to authenticate users. Persons of ordinary skill in the art having the benefit of these disclosures would recognize these and other benefits as well.

FIG. 1 is a block diagram of an exemplary image capture device 100. The functions of image capture device 100 may be implemented in one or more processors, one or more field-programmable gate arrays (FPGAs), one or more application-specific integrated circuits (ASICs), one or more state machines, digital circuitry, any other suitable circuitry, or any suitable hardware. Image capture device 100 may perform one or more of the example functions and processes described in this disclosure. Examples of image capture device 100 include, but are not limited to, a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), an Internet telephone, a digital camera, a digital video recorder, a handheld device, such as a portable video game device or a personal digital assistant (PDA), a drone device, a virtual reality device (e.g., a virtual reality headset), an augmented reality device (e.g., augmented reality glasses), or any device that may include one or more cameras.

As illustrated in the example of FIG. 1, image capture device 100 may include one or more image sensors 112, such as image sensor 112A, one or more lenses 113, such as lens 113A, and one or more camera processors, such as camera processor 114. In some instances, camera processor 114 may be an image signal processor (ISP) that employs various image processing algorithms to process image data (e.g., as captured by corresponding ones of these lenses and sensors). For example, camera processor 114 may include an image front end (IFE) and/or an image processing engine (IPE) as part of a processing pipeline. Further, a camera 115 may refer to a collective device including one or more image sensors 112, one or more lenses 113, and one or more camera processors 114.

In some examples, one image sensor 112 may be allocated for each lens 113. In some examples, each of a multiple image sensors 112 may be allocated to a lens 113 of a different type (e.g., wide lens, ultra-wide lens, telephoto lens, and/or periscope lens, etc.). For example, a wide lens 113 may correspond to a first image sensor 112 of a first size (e.g., 108 MP), whereas an ultra-wide lens 113 may correspond to a second image sensor 112 of a different size (e.g., 16 MP). In another example, a telephoto lens 113 may correspond to an image sensor 112 of a third size (e.g., 12 MP). In an illustrative example, a single image capture device 100 may include two or more cameras 115, where at least two of the cameras 115 correspond to image sensors 112 having a same size (e.g., two 12 MP sensors, three 108 MP sensors, three 12 MP sensors, two 12 MP sensors and a 108 MP sensor, etc.). In some examples, a single image sensor 112 may correspond to multiple lenses 113. For example, each of one or more image sensors 112 may correspond to different lenses 113 so as to provide multiple cameras 115 to image capture device 100.

In some examples, not illustrated in FIG. 1, image capture device 100 may include multiple cameras (e.g., a mobile phone having one or more front-facing cameras and one or more rear-facing cameras). For instance, image capture device 100 may include a first camera, such as camera 115 that includes a 16 MP image sensor, a second camera that includes a 108 MP image sensor, and a third camera that includes a 12 MP image sensor.

In some examples, image capture device 100 may include multiple cameras facing in different directions. For example, image capture device 100 may include dual "front-facing" cameras. Additionally, in some examples, image capture device 100 may include a "front-facing" camera, such as camera 115, and a "rear-facing" camera. In other examples, image capture device 115 may include dual "front-facing" cameras, which may include camera 115, and a "rear-facing" camera. In further examples, image capture device 115 may include three "front-facing" cameras, such as camera 115. In yet other examples, image capture device 115 may include three "front-facing" cameras, and one, two, or three "rear-facing" cameras. It should be noted that a person of skill in the art will appreciate that the techniques of this disclosure may be implemented for any type of camera and for any transitions between any number of cameras of image capture device 100.

In some instances, each camera 115 may include multiple camera processors 114. In some instances, camera processor 114 may be an image signal processor (ISP) that employs various image processing algorithms to process image data (e.g., as captured by lens 113 and sensor 112). In some examples, camera processor 114 may include an image front end (IFE) and/or an image processing engine (IPE) as part of a processing pipeline. In addition, camera 115 may include a single sensor 112 and a single lens 113, in some examples.

As illustrated, image capture device 100 may further include a central processing unit (CPU) 116, an encoder/decoder 117, a graphics processing unit (GPU) 118, a local memory 120 of GPU 118, a user interface 122, a memory controller 124 that provides access to system memory 130 and to instruction memory 132, and a display interface 126 that outputs signals that causes graphical data to be displayed on display 128.

Each of the image sensors 112, including image sensor 112A, may represent an image sensor that includes processing circuitry, an array of pixel sensors (e.g., pixels) for capturing representations of light, memory, an adjustable lens (such as lens 113), and an actuator to adjust the lens. By way of example, image sensor 112A may be associated with, and may capture images through, a corresponding one of lenses 113, such as lens 113A. In other examples, additional, or alternate, ones of image sensors 112 may be associated with, and capture images through, corresponding additional ones of lenses 113.

In some instances, image sensors 112 may include a monochrome sensor (e.g., a "clear" pixel sensor) and/or a color sensor (e.g., a Bayer sensor). For example, a monochrome pixel sensor may be established through a disposition of a monochrome filter over image sensor 112A. Further, in some examples, a color pixel sensor may be established through a disposition of a color filter, such as a Bayer filter, disposed over image sensor 112A, or through a disposition of a red filter, a green filter, or a blue filter disposed over image sensor 112A. Various other filter patterns exist, such as red, green, blue, white ("RGBW") filter arrays; cyan, magenta, yellow, white (CMYW) filter arrays; and/or variations thereof, including proprietary or non-proprietary filter patterns. Although this disclosure discusses certain examples in terms of particular filter patterns, other filter patterns may be used in accordance with the techniques of this disclosure.

Image sensors 112 may also include a subset of two or more different image sensors operating in conjunction with one another. For example, image sensors 112 may include two different "color" pixel sensors operating in conjunction with one another. The different color pixel sensors may support different binning types and/or binning levels, and although operating in conjunction with one another, the different color pixel sensors may each operate with respect to a particular range of zoom levels. Further, within each zoom level range, each of the different color pixel sensors may transition between various binning levels (e.g., transition from binning to non-binning modes). For example, camera processor 114 may cause two or more of image sensors 112 operating in conjunction with one another (e.g., the different color pixel sensors described herein) to each transition between various binning levels independently and in accordance with a respective binning transition thresholds, e.g., as stored in system memory 130.

Further, in some examples, multiple ones of lenses 113 may be associated with, and disposed over, respective subsets of image sensors 112. For instance, a first subset of sensors 112 may be allocated to a first one of lenses 113 (e.g., a wide lens camera, ultra-wide lens camera, telephoto lens camera, periscope lens camera, etc.), and a second subset of image sensors 112 may be allocated to a second one of lenses 113 distinct from the first subset. In some instances, each of lenses 113 may serve respective functions as provided by various attributes of the cameras (e.g., lens attributes, aperture attributes, angle-of-view attributes, thermal imaging attributes, etc.), and a user of image capture device 100 may leverage the various attributes of each of lenses 113 to capture one or more images or sequences of images (e.g., as in a video recording).

Additionally, in some instances, image capture device 100 may receive user input via user interface 132, and response to the received user input, CPU 116 and/or camera processor 114 may activate respective ones of lenses 113, or combinations of lenses 113. For example, the received user input may corresponding a user selection of lens 113A (e.g., a fisheye lens), and based on the received user input, CPU 116 may select an initial one of lenses 113 to activate and additionally, or alternatively, may transition from the initially selected lens to another one of lenses 113.

In other examples, CPU 116 and/or camera processor 114 may detect an operating condition that satisfies certain lens-selection criteria (e.g., digital zoom level satisfying a predefined camera transition threshold, a change in lighting conditions, input from a user calling for a particular lens 13, etc.), and may select the initial one of lenses 113, such as lens 113A, for activation based on the detected operating condition. In some examples, image capture device 100 may include multiple ones of camera 115, which may collectively capture one synthetic image or stream of synthetic images, such that camera processor 114 or CPU 116 may process one synthetic image or stream of synthetic images based on image data captured from sensors 112.

In some examples, each of lenses 113 and image sensors 112 may operate collectively to provide various optical zoom levels, angles of view (AOV), focal lengths, and FOVs. Further, light guides may be used to direct incident light from lenses 113 to a respective one of sensors 112, and examples of the light guides may include, but are not limited to, a prism, a moving prism, or one or more mirrors. For instance, light received from lens 113A may be redirected from image sensor 112A toward another one of image sensors 112. Further, in some instances, camera processor 114 may perform operations that cause a prism to move and redirect light incident lens 113A in order to effectively change the focal length for the received light.

Further, as illustrated in FIG. 1, a single camera processor, such as camera processor 114, may be allocated to and interface with all, or a selected subset, of image sensors 112. In other instances, multiple camera processors may be allocated to and interface with all, or a selected subset, of image sensors 112, and each of the camera processors may coordinate with one another to efficiently allocate processing resources to the all, or the selected subset, of image sensors 112. For example, and through the execution of stored instructions, camera processor 114 may implement multiple processing algorithms under various circumstances to perform digital zoom operations or other image processing operations.

Although the various components of image capture device 100 are illustrated as separate components, in some examples, the components may be combined to form a system on chip (SoC). As an example, camera processor 114, CPU 116, GPU 118, and display interface 126 may be implemented on a common integrated circuit (IC) chip. In some examples, one or more of camera processor 114, CPU 116, GPU 118, and display interface 126 may be implemented in separate IC chips. Various other permutations and combinations are possible, and the techniques of this disclosure should not be considered limited to the example illustrated in FIG. 1.

System memory 130 may store program modules and/or instructions and/or data that are accessible by camera processor 114, CPU 116, and GPU 118. For example, system memory 130 may store user applications (e.g., instructions for the camera application) and resulting images from camera processor 114. System memory 130 may additionally store information for use by and/or generated by other components of image capture device 100. For example, system memory 130 may act as a device memory for camera processor 114. System memory 130 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media, cloud-based storage medium, or an optical storage media.

Camera processor 114 may store data to, and read data from, system memory 130. For example, camera processor 114 may store a working set of instructions to system memory 130, such as instructions loaded from instruction memory 132. Camera processor 114 may also use system memory 130 to store dynamic data created during the operation of image capture device 100.

Similarly, GPU 118 may store data to, and read data from, local memory 120. For example, GPU 118 may store a working set of instructions to local memory 120, such as instructions loaded from instruction memory 132. GPU 118 may also use local memory 120 to store dynamic data created during the operation of image capture device 100. Examples of local memory 120 include one or more volatile or non-volatile memories or storage devices, such as RAM, SRAM, DRAM, EPROM, EEPROM, flash memory, a magnetic data media, a cloud-based storage medium, or an optical storage media.

Instruction memory 132 may store instructions that may be accessed (e.g., read) and executed by one or more of camera processor 114, CPU 116, and GPU 118. For example, instruction memory 132 may store instructions that, when executed by one or more of camera processor 114, CPU 116, and GPU 118, cause one or more of camera processor 114, CPU 116, and GPU 118 to perform one or more of the operations described herein. For instance, instruction memory 132 can include anti-spoofing model data 132a that, when executed by one or more of camera processor 114, CPU 116, and GPU 118, cause camera processor 114, CPU 116, and GPU 118 to execute a corresponding anti-spoofing model, such as the CNN described herein. Anti-spoofing model data 132a may further include, in some examples, configuration parameters, hyperparameters, and weights associated with the CNN (e.g., with the trained CNN). Instruction memory 132 may also store instructions that, when executed by one or more of camera processor 114, CPU 116, and GPU 118, cause one or more of camera processor 114, CPU 116, and GPU 118 to perform image processing operations, such as one or more of automatic focus (AF), automatic exposure (AE), automatic gain (AG), or automatic white balance (AWB). Instruction memory 130 may include read-only memory (ROM) such as EEPROM, flash memory, a removable disk, CD-ROM, any non-volatile memory, any non-volatile memory, or any other suitable memory.

The various components of image capture device 100, as illustrated in FIG. 1, may be configured to communicate with each other across bus 135. Bus 135 may include any of a variety of bus structures, such as a third-generation bus (e.g., a HyperTransport bus or an InfiniBand bus), a second-generation bus (e.g., an Advanced Graphics Port bus, a Peripheral Component Interconnect (PCI) Express bus, or an Advanced eXtensible Interface (AXI) bus), or another type of bus or device interconnect. It is to be appreciated that the specific configuration of components and communication interfaces between the different components shown in FIG. 1 is merely exemplary, and other configurations of the components, and/or other image processing systems with the same or different components, may be configured to implement the operations and processes of this disclosure.

Camera processor 114 may be configured to receive image frames (e.g., pixel data, image data) from image sensors 112, and process the image frames to generate image and/or video content. For example, image sensor 112A may be configured to capture individual frames, frame bursts, frame sequences for generating video content, photo stills captured while recording video, image previews, or motion photos from before and/or after capture of a still photograph. CPU 116, GPU 118, camera processor 114, or some other circuitry may be configured to process the image and/or video content captured by image sensor 112A into images or video for display on display 128. In an illustrative example, CPU 116 may cause image sensor 112A to capture image frames, and may receive pixel data from image sensor 112A. In the context of this disclosure, image frames may generally refer to frames of data for a still image or frames of video data or combinations thereof, such as with motion photos. Camera processor 114 may receive, from image sensors 112, pixel data of the image frames in any suitable format. For instance, the pixel data may be formatted according to a color format such as RGB, YCbCr, or YUV.

In some examples, camera processor 114 may include an image signal processor (ISP). For instance, camera processor 114 may include an ISP that receives signals from image sensors 112, converts the received signals to image pixels, and provides the pixel values to camera processor 114. Additionally, camera processor 114 may be configured to perform various operations on image data captured by image sensors 112, including auto gain, auto white balance, color correction, or any other image processing operations.

Memory controller 124 may be communicatively coupled to system memory 130 and to instruction memory 132. Memory controller 124 may facilitate the transfer of data going into and out of system memory 130 and/or instruction memory 132. For example, memory controller 124 may receive memory read and write commands, such as from camera processor 114, CPU 116, or GPU 118, and service such commands to provide memory services to system memory 130 and/or instruction memory 132. Although memory controller 124 is illustrated in the example of FIG. 1 as being separate from both CPU 116 and system memory 130, in other examples, some or all of the functionality of memory controller 124 with respect to servicing system memory 130 may be implemented on one or both of CPU 116 and system memory 130. Likewise, some or all of the functionality of memory controller 124 with respect to servicing instruction memory 132 may be implemented on one or both of CPU 116 and instruction memory 132.

Camera processor 114 may also be configured, by executed instructions, to analyze image pixel data and store resulting images (e.g., pixel values for each of the image pixels) to system memory 130 via memory controller 124. Each of the images may be further processed for generating a final image for display. For example, GPU 118 or some other processing unit, including camera processor 114 itself, may perform color correction, white balance, blending, compositing, rotation, digital zoom, or any other operations to generate the final image content for display.

In addition, image capture device 100 may include a video encoder and/or video decoder 117, either of which may be integrated as part of a combined video encoder/decoder (CODEC). Encoder/decoder 117 may include a video coder that encodes video captured by one or more camera(s) 115 or a decoder that decodes compressed or encoded video data. In some instances, CPU 116 may be configured to encode and/or decode video data using encoder/decoder 117.

CPU 116 may comprise a general-purpose or a special-purpose processor that controls operation of image capture device 100. A user may provide input to image capture device 100 to cause CPU 116 to execute one or more software applications. The software applications executed by CPU 116 may include, for example, a camera application, a graphics editing application, a media player application, a video game application, a graphical user interface application or another program. For example, an executed camera application may allow the user to control various settings of camera 115, e.g., via input provided to image capture device 100 via user interface 122. Examples of user interface 122 include, but are not limited to, a pressure-sensitive touchscreen unit, a keyboard, a mouse, or an audio input device, such as a microphone. For example, user interface 122 may receive input from the user to adjust desired zoom levels (e.g., digital zoom levels), alter aspect ratios of image data, record video, take a snapshot while recording video, apply filters when capturing images, select a region-of-interest (ROI) (e.g., a FOZ) for AF, AE, AG, or AWB operations, record slow motion video or super slow motion video, apply night shot settings, and/or capture panoramic image data, among other examples.

By way of example, CPU 116 may execute the camera application and, the executed camera application may cause CPU 116 to generate content that is displayed on display 128. For instance, display 128 may display information such as a preview of an image as captured by one or more of sensors 112, a configured light intensity, whether flash is enabled, and other such information. The user of image capture device 100 may interface with display 128 (e.g., via user interface 122) to configure the manner in which the images are generated (e.g., with or without flash, focus settings, exposure settings, gain settings, white balance settings, as well as other settings or parameters). The executed camera application may also cause CPU 116 to instruct camera processor 114 to process the images captured by sensor 112 in a user-defined manner. For example, CPU 116 may instruct camera processor 114 to perform a zoom operation on the images captured by one or more of sensors 112, e.g., in response to a request to zoom provided by the user via user interface 122. The request for zoom may include, but is not limited to, a pinch-to-zoom command, a discrete input, such as operation of a 0.5× zoom button, 2× zoom button, 3× zoom button, 10× zoom button, etc., a slider input, or some combination thereof.

Further, in some examples, a zoom operation may include a digital zoom defined by a zoom field (e.g., the FOZ described herein). For instance, a zoom field may include a portion of less than the full FOV of sensor 112. CPU 116 may instruct camera processor 114 to perform the digital zoom operation based on the zoom field.

As described herein, one or more of CPU 116 and GPU 118 may perform operations that apply a trained machine learning process, such as the CNN characterized by anti-spoofing model data 132*a* stored in instruction memory 132, to a frame of image data captured by one or more of image sensors 112. For example, anti-spoofing model data 132*a* may characterize a trained CNN model that includes a plurality of convolutional layers including down sampling layers and up sampling layers. Each down sampling layer may be associated with a different resolution of the image data. For example, a first down sampling layer may receive and process a 256 pixel by 256 pixel input image to generate first down sampling layer output data (e.g., feature map data). The first down sampling layer output data may be "pooled" and include, for example, a 128 pixel by 128 pixel image. A first joint spatial and channel attention (JSCA) layer may receive and process the first down sampling layer output data to generate first JSCA layer output data. The first JSCA layer output data may correspond, in size, to the received first down sampling layer output data. Further, a second down sampling layer may receive and process the 128 pixel by 128 pixel first JSCA layer output data to generate second down sampling layer output data. The second down sampling layer output data may be "pooled" and include, for example, a 64 pixel by 64 pixel image. Similarly, a second JSCA layer may receive and process the second down sampling layer output data to generate second JSCA layer output data, which in this example may correspond in size to the received second down sampling layer output data (i.e., 64 pixel by 64 pixel image).

Further, a first up sapling layer may receive and process input image data, such as the second JSCA layer output data, and generate first up sampling layer output data. The first up sampling layer output data may be "unpooled" and include, for example, a 128 pixel by 128 pixel image. A third JSCA layer may receive and process the first up sampling layer output data to generate third JSCA layer output data. The third JSCA layer output data may correspond, in size, to the received first up sampling layer output data. Further, a second up sampling layer may receive and process the 128 pixel by 128 pixel third JSCA layer output data to generate second up sampling layer output data. The second up sampling layer output data may be "unpooled" and include, for example, a 256 pixel by 256 pixel image. Similarly, a fourth JSCA layer may receive and process the second up sampling layer output data to generate fourth JSCA layer output data, which in this example may correspond in size to the received second up sampling layer output data (i.e., 256 pixel by 256 pixel image). Although described with respect to two down sampling layers, two up sampling layers, and four JSCA layers, the CNN may include any number of convolutional layers, including any number of down sampling layers and any number of up sampling layers.

The trained CNN may further include, in some examples, one or more of a flattening layer and a linear layer. The flattening layer may operate on the output data generated from the convolutional layers (e.g., the last up sampling layer) to generate a feature vector. For example, the flattening layer may convert the output data from the last up sampling layer into a one-dimensional array. Further, the linear layer may operate on the feature vector generated by the flattening layer to provide a fully connected layer that generates the map data characterizing the intensity values.

As described herein, the one or more of CPU 116 and GPU 118 may determine, based on the intensity values, whether the input image includes an unauthentic object. For example, the one or more of CPU 116 and GPU 118 may sum all, or at least a portion of, the intensity values to determine a total intensity value, and may compare the total intensity value to a predetermined threshold. If the total intensity value meets or exceeds the predetermined threshold, the one or more of CPU 116 and GPU 118 generate output data characterizing the input image as including an unauthorized object. Otherwise, the one or more of CPU 116 and GPU 118 may generate output data characterizing the input image as not including an unauthorized object when the total intensity value fails to meet or exceed the predetermined threshold. In some examples, the one or more of CPU 116 and GPU 118 may apply a predetermined weight to one or more of the intensity values, where each weight is based on a position within a captured image of the intensity value's corresponding pixel. For example, pixels towards a "middle" of a captured image frame may be weighted heavier than pixels closer to an edge of the image frame. The one or more of CPU 116 and GPU 118 may then determine the total intensity value based on the weighted intensity values.

In some examples, the one or more of CPU 116 and GPU 118 filter the intensity values by determining a number of intensity values, if any, with a value above a predetermined threshold. The one or more of CPU 116 and GPU 118 may generate output data characterizing the input image as including an unauthorized object when the number of intensity values meets or exceeds the predetermined threshold. Otherwise, the one or more of CPU 116 and GPU 118 may generate output data characterizing the input image as not including an unauthorized object when the number of intensity values fails to meet or exceed the predetermined threshold.

In yet other examples, the one or more of CPU 116 and GPU 118 may determine whether intensity values corresponding to a predetermined number of pixels that are within a predetermined distance (e.g., Euclidean distance) from each other sum to meet or exceed a predetermined threshold. For example, the one or more of CPU 116 and GPU 118 may determine whether the intensity values for pixels within a predetermined Euclidean distance of a central pixel sum to meet or exceed the predetermined threshold. The one or more of CPU 116 and GPU 118 may generate output data characterizing the input image as including an unauthorized object when the sum of the intensity values meets or exceeds the predetermined threshold. Otherwise, the one or more of CPU 116 and GPU 118 may generate output data characterizing the input image as not including an unauthorized object when the sum of the intensity values fails to meet or exceed the predetermined threshold.

In some examples, the image capture device 100 transmits, via transceiver 119, the output data to a computing device, such as a server or a user's handheld device (e.g., cellphone). For example, the image capture device 100 may transmit a message to another computing device, such as a verified user's handheld device, based on the output data. In some examples, the transmitted message causes the receiving device to display a notification characterizing an attempted access (e.g., to the image capture device 100), and whether the access was attempted with a spoofed image (e.g., and thus unauthorized), or an un-spoofed image (e.g., and thus authorized).

FIG. 2A is a block diagram illustrating exemplary portions of the image capture device 100 of FIG. 1. In this example, image capture device 100 includes a spoofing detection engine 202 and a spoofing determination engine 204. Each of spoofing detection engine 202 and spoofing determination engine 204 may, in some examples, be implemented in hardware. In other examples, each of spoofing detection engine 202 and spoofing determination engine 204 may be executable instructions stored within instruction memory 132 that can be executed by, for example, one or more of CPU 116 and GPU 118.

As illustrated, one or more cameras 115 may capture an image (e.g., via lens 113A) and may generate image data 201 characterizing one or more channels of the captured image. In some examples, image data 201 represents one or more channels, such as one or more of the RGB, YCbCr, or YUV color channels. Spoofing detection engine 202 may receive image data 201, and may apply a trained CNN model (e.g., the anti-spoofing model described herein) to the image data 201 to generate elements of map data 203 that comprise intensity values as described herein. For example, spoofing detection engine 202 may obtain anti-spoofing model data 132A from instruction memory 132, and may configure the trained CNN model with one or more of the configuration parameters, hyperparameters, and/or weights characterized and identified by the anti-spoofing model data 132A. Further, spoofing detection engine 202 may execute the trained and configured CNN model to ingest elements of the image data 201 and generate the elements of the map data 203.

Figure 2B:
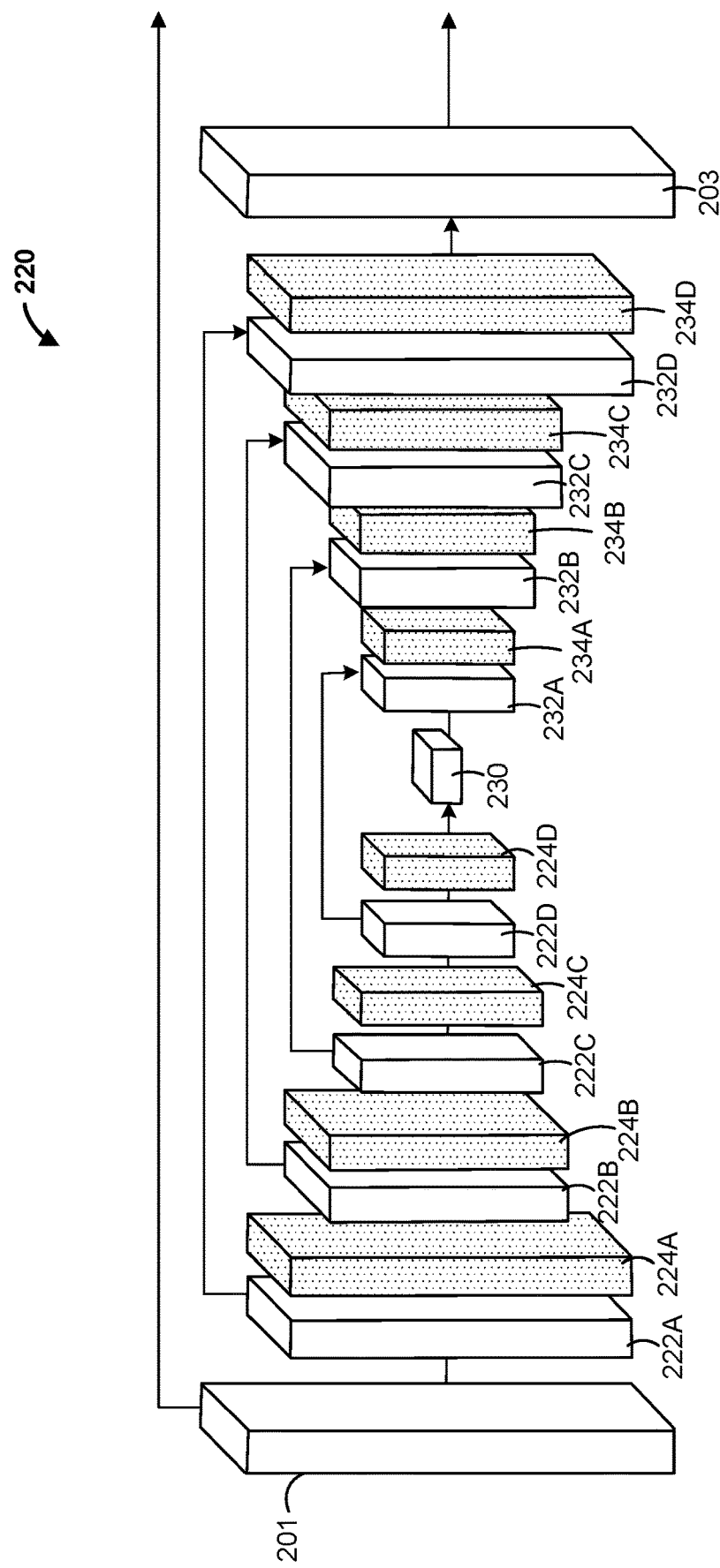

FIG. 2B illustrates exemplary portions of a trained CNN 220 (e.g., an anti-spoofing model) that may be implemented by spoofing detection engine 202. In this example, trained CNN 220 includes a plurality of down sample layers 222, a plurality of up sample layers 232, and a plurality of JSCA layers 224, 234, which provide spatial attention and channel attention. Specifically, a JSCA layer 224, 234 follows each of the down sample layers 222 and up sample layers 232.

For example, first down sample layer 222A receives image data 201, and generates first down sampled data as described herein. Further, first JSCA layer 224A receives the first down sampled data and generates first JSCA output data. A second down sample layer 222B receives the first JSCA output data and generates second down sampled data. A second JSCA layer 224B receives the second down sampled data and generates second JSCA output data. Additionally, a third down sample layer 222C receives the second JSCA output data and generates third down sampled data. A third JSCA layer 224C receives the third down sampled data and generates third JSCA output data. Further, a fourth down sample layer 222D receives the third JSCA output data and generates fourth down sampled data. A fourth JSCA layer 224D receives the fourth down sampled data and generates fourth JSCA output data, which is provided to intermediate layer 230. Intermediate layer 230 serves as an intermediate transition from the down sample layers 22 to the up sample layers 232. For example, the intermediate layer 232 may act as a bottleneck layer that may contain fewer nodes compared to the previous layers (e.g., down sample layers), and can obtain a representation of the input with reduced dimensionality (e.g., may act as a constraint to the amount of data that can pass through). Further, the intermediate layer 230 may provide a triplet feature that can be used for the computation of a triplet loss, as described herein.

Further, a first up sample layer 232A receives the output data of the intermediate layer 230 as well as the fourth down sampled data from the fourth down sample layer 222D, and generates first up sampled data as described herein. A fifth JSCA layer 234A, which follows first up sample layer 232A, receives the first up sampled data and generates fifth JSCA output data. A second up sample layer 232B receives the fifth JSCA output data as well as the third down sampled data from the third down sample layer 222C, and generates second up sampled data. A sixth JSCA layer 234B receives the second up sampled data and generates sixth JSCA output data. Additionally, a third up sample layer 232C receives the sixth JSCA output data and the second down sampled data from the second down sample layer 222B, and generates third up sampled data. A seventh JSCA layer 234C receives the third up sampled data and generates seventh JSCA output data. Further, a fourth up sample layer 232D receives the seventh JSCA output data and the first down sampled data from the first down sample layer 222A, and generates fourth up sampled data. An eighth JSCA layer 234D receives the fourth up sampled data and generates eighth JSCA output data.

The eighth JSCA layer 234D may also operate, in some examples, as a fully connected layer that generates the map data 203 characterizing the intensity values. In some examples, the trained CNN 220 includes one or more fully connected layers that receive and operate on the eighth JSCA output data to generate the map data 203.

Figure 2C:
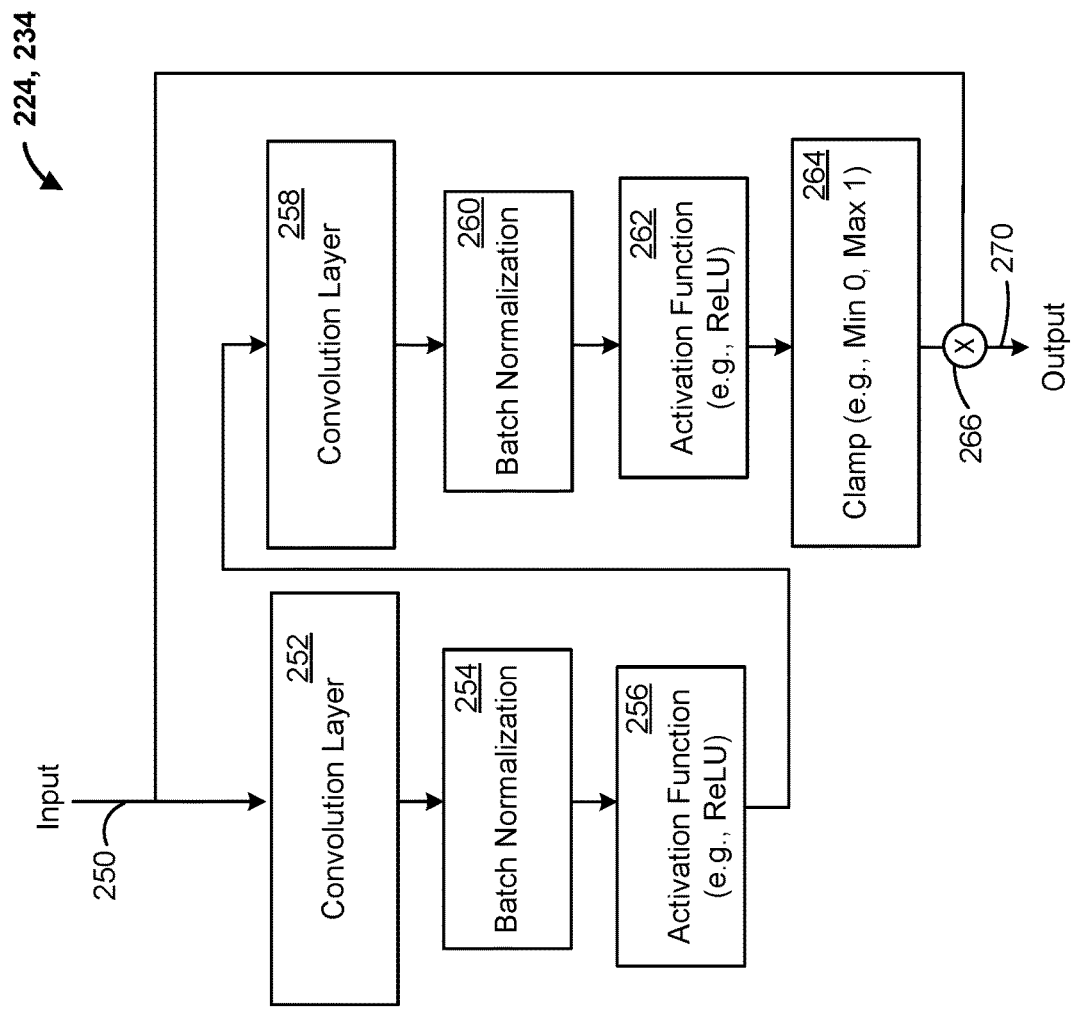

FIG. 2C illustrates an example JSCA layer, such as an example of one of the JSCA layers 224, 234. For example, each JSCA layer 224, 234 may include a first convolution layer module 252, a first batch normalization module 254, a first activation function module 256 (e.g., such as an ReLU), a second convolution layer 258, a second batch normalization module 260, a second activation function module 262, and, in some examples, a clamping module 264.

In this example, the first convolution layer module 252 receives and operates on the input data 250, which may be the output data of the immediately preceding down sampling layer or up sampling layer. The first batch normalization module 254 receives and performs batch normalization processes on the output of the first convolution layer module 252. Further, the first activation function module 256 receives the output of the first batch normalization module 254 and generates a transformed output.

Additionally, the second convolution layer 258 receives and operates on the transformed output of the first activation function module 256. The second batch normalization module 260 receives and performs batch normalization processes on the output of the second convolution layer module 258. Further, the second activation function module 262 receives the output of the second batch normalization module 260 and generates a second transformed output that may characterize one or more weight values. Further, the clamping module 264 may assure that the one or more weight values fall at or within a certain range, such as between 0 and 1, inclusive. For example, the clamping module 264 may adjust any weights greater than 1 to 1, and may adjust any weights less than 0 to 0.

Further, the JSCA layer 224, 234 includes a multiplying function module 266 that scales the input 250 based on the one or more clamped weights received from the clamping module 264, and provides the scaled output data 270, for example, as input the a next down sampling or up sampling layer, as described herein.

Referring back to FIG. 2A, spoofing determination engine 204 may receive the map data 203 generated by the spoofing detection engine 202, and may generate image spoof data 205 characterizing whether the image data 201 is spoofed. For example, and as described herein, map data 203 may characterize a plurality of intensity values that correspond to image data 201. Spoofing detection engine 202 may perform any of the operations described herein to determine whether the image data 201 includes an unauthorized object based on the intensity values. For example, spoofing determination engine 204 may determine whether a sum of the intensity values meets or exceeds a predetermined threshold. If the sum of the intensity values meets or exceeds the predetermined threshold, spoofing determination engine 204 generates image spoof data 205 indicating that the image data 201 includes an unauthorized object (e.g., image spoof data 205 may comprise a "1"). In some examples, image spoof data 205 further indicates an area or portion of image data 201 that is spoofed. For example, spoofing determination engine 204 may determine one or more pixels with intensity values that meet or exceed a predetermined threshold, and may generate image spoof data 205 that identifies those pixels (e.g., via x and y coordinates).

Further, in some examples, if spoofing determination engine 204 determines that the sum of the intensity values does not meet or exceed the predetermined threshold, spoofing determination engine 204 may generate image spoof data 205 indicating that image data 201 does not include an unauthorized object (e.g., image spoof data 205 may comprise a "0"). Spoofing determination engine 204 may store image spoof data 205 in a data repository, such as within system memory 131.

Figure 3A:
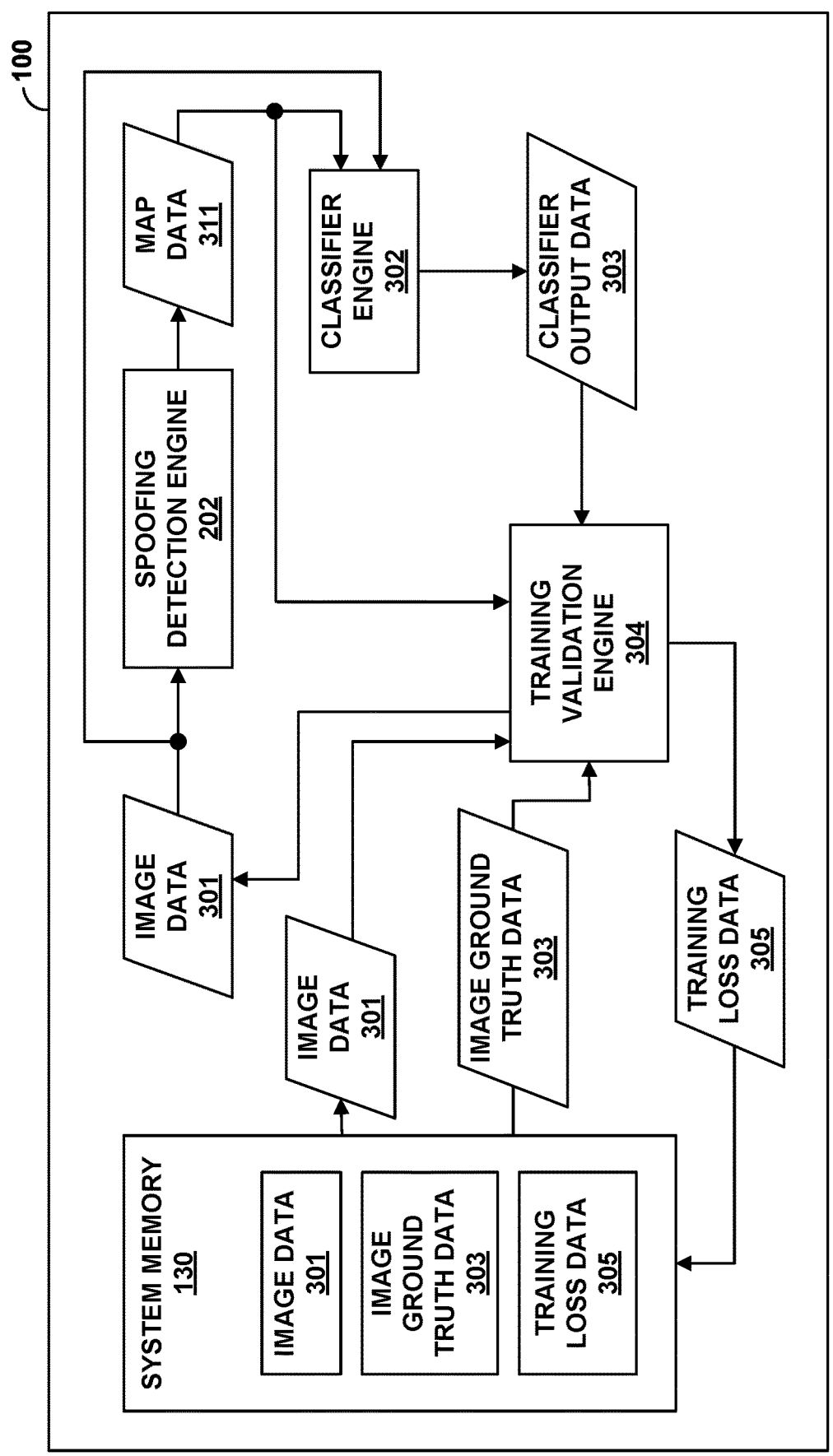

FIG. 3A illustrates a block diagram of exemplary portions of the image capture device 100 of FIG. 1 that may be employed during training of the machine learning processes described herein. In this example, image capture device 100 includes a classifier engine 302 and a training validation engine 304. Each of classifier engine 302 and training validation engine 304 may, in some examples, be implemented in hardware. In other examples, each of classifier engine 302 and training validation engine 304 may be executable instructions stored within instruction memory 132 that can be executed by, for example, one or more of CPU 116 and GPU 118.

In this example, training validation engine 304 may obtain, from system memory 130, image data 301, which may include a plurality of images forming one or more training data sets. For example, each training data set may include un-spoofed and spoofed images that may be labelled as such. Training validation engine 304 may provide the image data 301 to spoof detection engine 202 to train, for example, a CNN model, such as CNN 220. During training, spoofing detection engine 202 generates map data 311, which may characterize a plurality of intensity values.

Figure 3B:
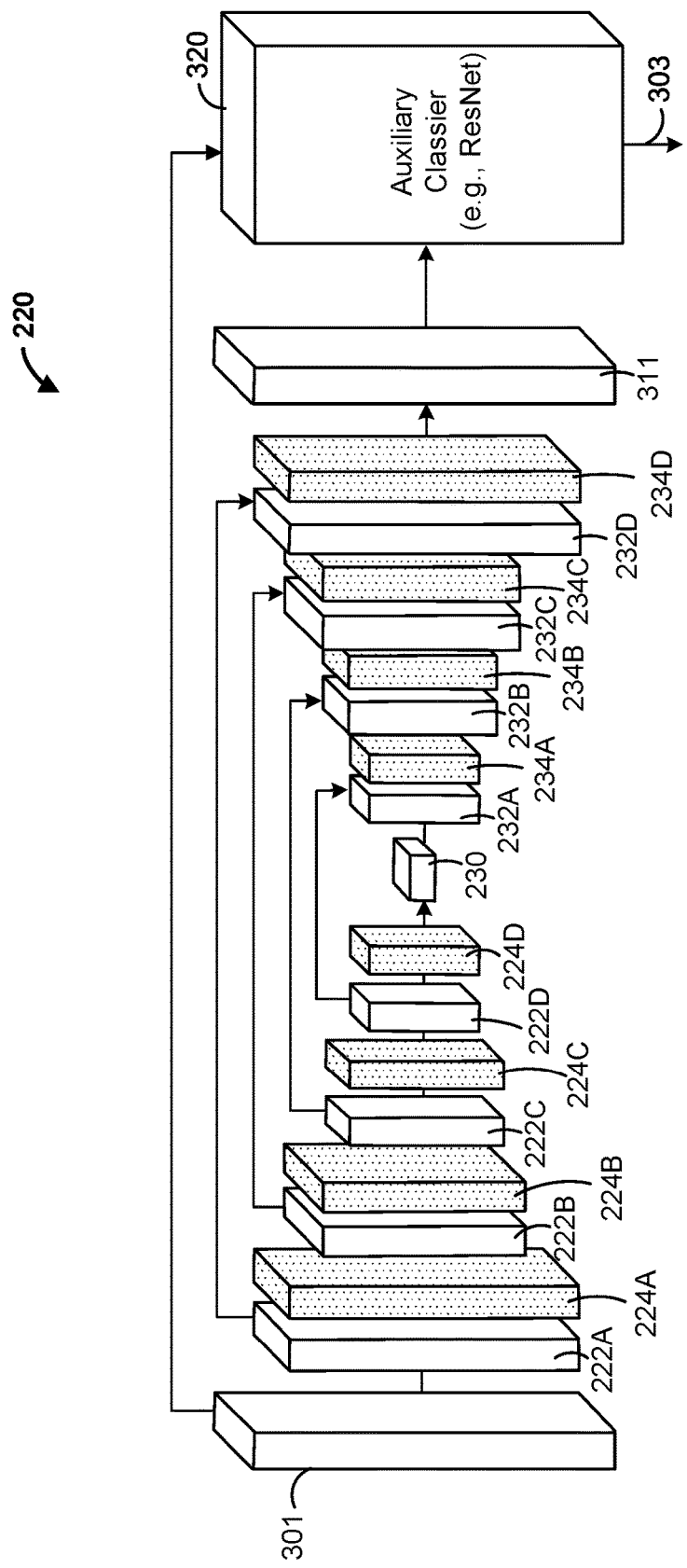

Classifier engine 302 receives the map data 311, as well as the image data 301, and applies an executed auxiliary classifier, such as the pre-trained CNN image classifier described herein, to the map data 311 and image data 301 to generate classifier output data 303. The classifier output data 303 characterizes a loss between the map data 311 and the image data 301. For example, FIG. 3B illustrates the CNN model 220 of FIG. 2B during in training. In this example, an auxiliary classifier 320, executed by classifier engine 302, receives image data 301 and the map data 311 from CNN model 220, and generates classifier output data 303 characterizing a loss between the map data 311 and the image data 301.

Referring back to FIG. 3A, training validation engine 304 may compute one or more losses to determine whether the in-training CNN executed by spoofing detection engine 202 has converged. For example, training validation engine 304 may determine one or more of a triplet loss, a regression loss, and a classification loss (e.g., cross-entropy loss), among others, based on one or more of the classifier output data 303, the map data 311, and the image ground truth data 303 characterizing ground truths of the corresponding image data 301 (e.g., guided ground truth output maps). For example, training validation engine 304 may execute a sigmoid function that operates on the classifier output data 303. The sigmoid function can serve as an amplifier to enhance the spoof response generated from the in-training CNN. Further, training validation engine 304 may provide output generated by the executed sigmoid function as feedback to the in-training CNN, so as to encourage more zeros and ones from the generated output.

Training validation engine 304 may compute a classification loss based on the classifier output data 303 and the image ground truth data 303. Training validation engine 304 may also compute a triplet loss based on an output generated by the intermediate layer 230, which may act as the anchor, and the image ground truth data 303, which may include the positive and negative inputs. Further, training validation engine 304 may provide the classification loss and the triplet loss as feedback to the in-training CNN.

Training validation engine 304 may further determine whether one or more of the computed losses satisfy a corresponding threshold to determine whether the in-training CNN has converged. For example, training validation engine 304 may compare each computed loss to its corresponding threshold to determine if each computed loss meets or exceeds its corresponding threshold. In some examples, when each of the computed losses meet or exceed their corresponding thresholds, training validation engine 304 determines the in-training CNN has converged, and training is complete. Further, training validation engine 304 generates training loss data 305 characterizing the computed losses, and stores training loss data 305 within system memory 130.

In some examples, training validation engine 304 provides additional image data 301 characterizing a validation data set to the initially trained CNN executed by spoofing detection engine 202 to determine whether the initially trained CNN is sufficiently trained. For example, spoofing detection engine 202 may apply the initially trained CNN to the image data 301 characterizing the validation data set to generate map data 311. Classifier engine 302 may apply the auxiliary CNN as described herein to the map data 311 to generate additional classifier output data 303. Based on the classifier output data 303 and the image ground truth data 303 corresponding to the images of the validation data set, training validation engine 304 computes one or more losses as described herein. If the computed losses indicate that the CNN is not sufficiently trained (e.g., the one or more computed losses do not meet their corresponding thresholds), training validation engine 304 continues to train the CNN (e.g., with additional training images).

Although, as described, image capture device 100 trains CNN 200, one or more of any suitable processing devices associated with image capture device 100 may train CNN 200 as described herein. For example, one or more servers, such as one or more cloud-based servers, may train CNN 200. In some examples, one or more processors (e.g., CPUs, GPUs) of a distributed or cloud-based computing cluster may train CNN 200. In some implementations, CNN 200 is trained by another processing device associated with image capture device 100, and the other processing device stores the configuration parameters, hyperparameters, and/or weights associated with the trained CNN 200 in a data repository over a network (e.g., the Internet). Further, image capture device 100 obtains, over the network, the stored configuration parameters, hyperparameters, and/or weights, and stores them within instruction memory 132 (e.g., within anti-spoofing model data 132a). Image capture device 100 may then establish CNN 200 based on the configuration parameters, hyperparameters, and/or weights stored within instruction memory 132 (anti-spoofing model data 132a).

Figure 4:
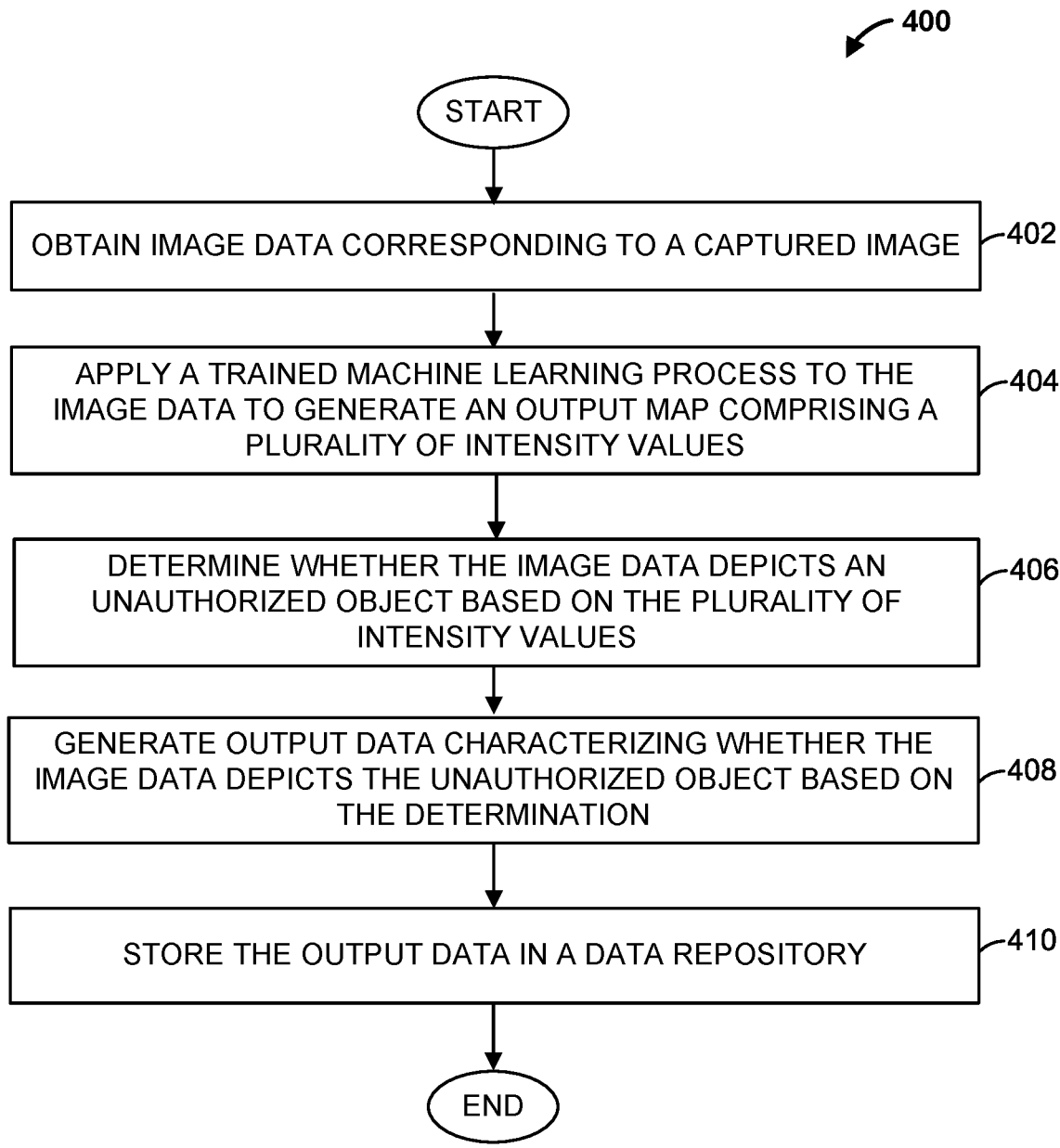
FIG. 4 is a flowchart of an exemplary process for applying a trained machine learning process to image data to determine whether an image is spoofed, according to some implementations.

FIG. 4 is a flowchart of an example process 400 for applying a trained machine learning process to image data to determine whether an image includes an unauthorized object, in accordance with one implementation. Process 400 may be performed by one or more processors executing instructions locally at a computing device, such as by one or more of camera processor 114, CPU 116, and GPU 118 of image capture device 100 of FIG. 1. Accordingly, the various operations of process 400 may be represented by executable instructions held in storage media of one or more computing platforms, such as instruction memory 132 of image capture device 100.

At block 402, image capture device 100 obtains image data corresponding to a captured image. For example, the image capture device 100 may capture an image of a user to authenticate the user. At step 404, the image capture device 100 applies a trained machine learning process to the image data to generate an output map that includes a plurality of intensity values. For example, image capture device 100 may obtain, from instruction memory 132, anti-spoofing model data 132a characterizing configuration parameters, hyperparameters, and/or weights for a trained CNN, and may configure a CNN based on the obtained configuration parameters, hyperparameters, and/or weights. Further, image capture device 100 executes the configured CNN to ingest elements of the image data and, based on the ingested elements, the configured and executed CNN generates map data characterizing a plurality of intensity values.

Further, and at step 406, the image capture device 100 determines whether the captured image includes an unauthorized object based on the plurality of intensity values. For example, and as described herein, the image capture device may determine whether the captured image depicts an unauthorized object based on a sum of at least a portion of the intensity values. At step 408, and based on the determination of step 406, the image capture device 100 generates output data characterizing whether the captured image includes an unauthorized object. For example, the output data may include a "1" if the image includes an unauthorized object, and a "0" if the image does not include an unauthorized object.

Proceeding to step 410, the image capture device 100 may store the output data in a data repository. For example, the image capture device 100 may store the output data within system memory 130. In some examples, image capture device 100 transmits a message to another computing device, such as a verified user's handheld device, based on the output data. In some examples, the transmitted message causes the receiving device to display a notification characterizing an attempted access (e.g., to the image capture device 100), and whether the access was attempted with a spoofed image (e.g., and thus unauthorized), or an un-spoofed image (e.g., and thus authorized).

Figure 5:
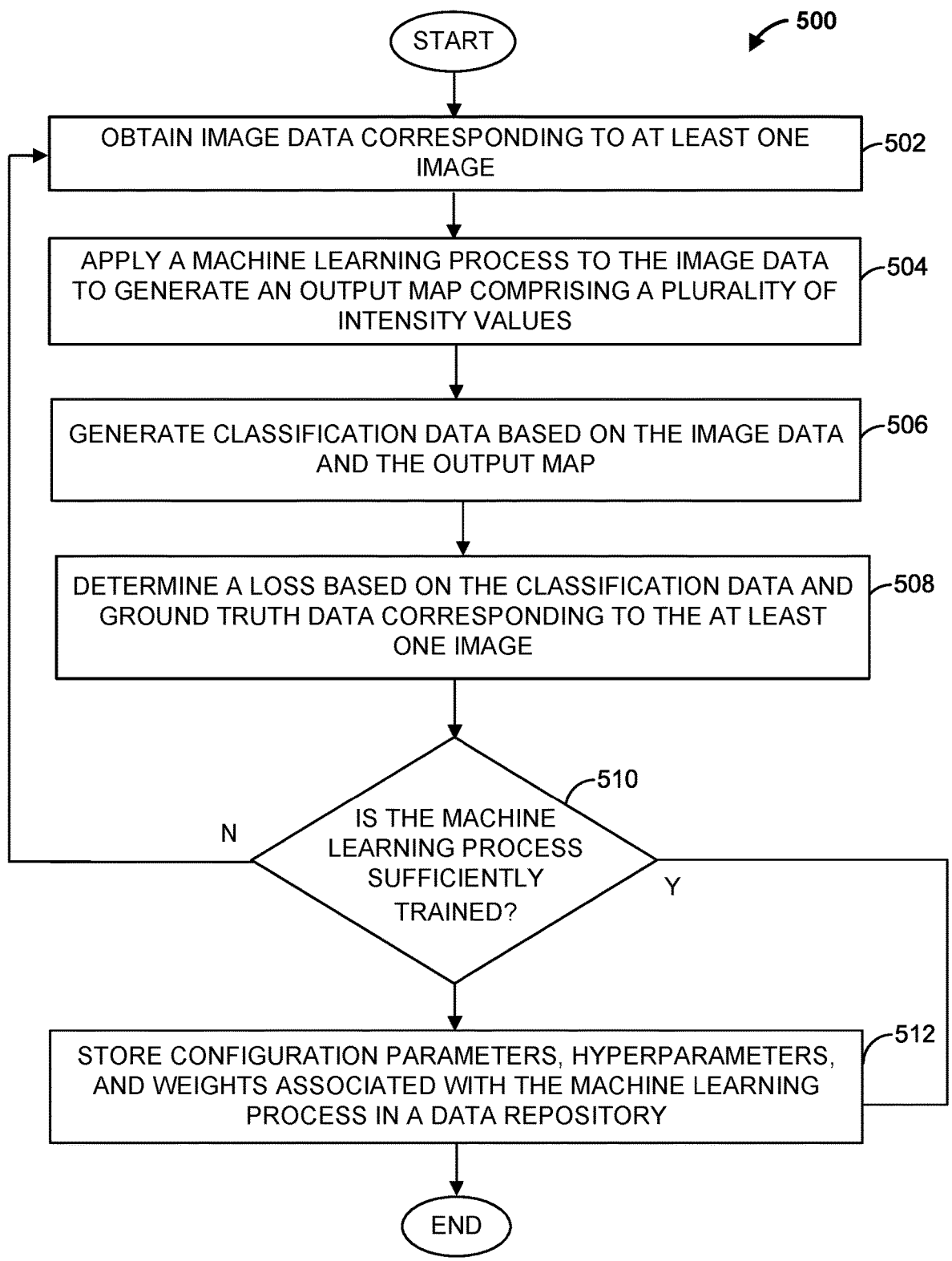
FIG. 5 is a flowchart of an exemplary process for training a machine learning process, according to some implementations.

FIG. 5 is a flowchart of an example process 500 for training a machine learning process, in accordance with one implementation. Process 500 may be performed by one or more processors executing instructions locally at a computing device, such as by one or more of camera processor 114, CPU 116, and GPU 118 of image capture device 100 of FIG. 1. Accordingly, the various operations of process 800 may be represented by executable instructions held in storage media of one or more computing platforms, such as instruction memory 132 of image capture device 100.

At block 502, the image capture device obtains image data corresponding to at least one image. For example, the image capture device 100 may obtain image data 301 characterizing images of a training data set. At block 504, the image capture device 100 applies a machine learning process to the image data to generate an output map comprising a plurality of intensity values. For example, image capture device 100 may cause a CNN, such as the CNN 200 described herein, to ingest elements of the image data and, based on the ingested elements of image data, generate the output map.

Proceeding to step 506, the image capture device 100 generates classification data based on the image data and the output map. For example, image capture device 100 may execute an auxiliary classifier that receives as an input the output map and the image data to generate classification data characterizing a loss between the output map and the input data as described herein. At step 508, the image capture device 100 computes a loss based on the classification data and ground truth data corresponding to the at least one image. For example, the image capture device 100 may compute at least one of a triplet loss and a regression loss based on the output data and the ground truth data.

Further, at step 510, the image capture device determines whether the machine learning process is sufficiently trained based on the computed loss. For example, the image capture device 100 may compare the computed loss to a predetermined threshold. If the computed loss is not beyond the threshold, the image capture device 100 determines that the machine learning process is not sufficiently trained and the method proceeds back to step 502, where additional image data is obtained for further training operations. If, however, the computed loss is beyond the threshold, the image capture device 100 determines that the machine learning process is sufficiently trained and the method proceeds to step 512. At step 512, the image capture device stores one or more of configuration parameters, hyperparameters, and weights learned during the training in a data repository. For example, the image capture device may store the one or more of configuration parameters, hyperparameters, and weights within anti-spoofing model data 132a of instruction memory 132.

Implementation examples are further described in the following numbered clauses:

1. An apparatus comprising:
   a non-transitory, machine-readable storage medium storing instructions; and
   at least one processor coupled to the non-transitory, machine-readable storage medium, the at least one processor being configured to:
   obtain image data;
   apply a trained machine learning process to the image data to generate an output map comprising intensity values;
   determine whether the image data depicts an unauthentic object based on the intensity values; and
   generate, based on the determination, output data characterizing whether the image data depicts the unauthentic object.
2. The apparatus of clause 1, wherein the trained machine learning process comprises establishing a convolutional neural network.
3. The apparatus of clause 2, wherein the convolutional neural network comprises a plurality of down sampling layers, a plurality of up sampling layers, and a joint spatial and channel attention layer following each of the plurality of down sampling layers and each of the plurality of up sampling layers.

4. The apparatus of clause 3, wherein each of the plurality of up sampling layers is configured to receive an output from a corresponding one of the plurality of down sampling layers and an output from a preceding one of the joint spatial and channel attention layers.

5. The apparatus of any of clauses 1-4, wherein the at least one processor is configured to:
determine that the image data depicts the unauthentic object based on the intensity values; and
deny access to at least one function of the apparatus based on the determination.

6. The apparatus of clause 5, wherein the at least one processor is further configured to transmit a message to a device of a preauthorized user, wherein the message characterizes the denied access.

7. The apparatus of any of clauses 1-6, wherein the at least one processor is further configured to:
obtain a training set of images;
apply the machine learning process to the training set of images to generate training output maps;
apply an auxiliary classifier to the output maps and the training set of images to generate classification data; and
determine whether the machine learning process is trained based on the classification data.

8. The apparatus of clause 7, wherein determining whether the machine learning process is trained comprises determining at least one loss based on the classification data and ground truth data corresponding to the training set of images.

9. The apparatus of any of clauses 1-8, wherein determining whether the image data depicts the unauthentic object based on the intensity values comprises:
determining a total intensity value based on the plurality of intensity values; and
comparing the total intensity value to a predetermined threshold.

10. The apparatus of any of clauses 1-9 comprising a camera configured to capture the image data.

11. The apparatus of any of clauses 1-10 comprising a display configured to display the image data.

12. A method comprising:
obtaining image data;
applying a trained machine learning process to the image data to generate an output map comprising intensity values;
determining whether the image data depicts an unauthentic object based on the intensity values; and
generating, based on the determination, output data characterizing whether the image data depicts the unauthentic object.

13. The method of clause 12, wherein the trained machine learning process comprises establishing a convolutional neural network.

14. The method of clause 13, wherein the convolutional neural network comprises a plurality of down sampling layers, a plurality of up sampling layers, and a joint spatial and channel attention layer following each of the plurality of down sampling layers and each of the plurality of up sampling layers.

15. The method of clause 14, wherein each of the plurality of up sampling layers is configured to receive an output from a corresponding one of the plurality of down sampling layers and an output from a preceding one of the joint spatial and channel attention layers.

16. The method of any of clauses 12-15, further comprising:
obtaining a training set of images;
applying the machine learning process to the training set of images to generate training output maps;
applying an auxiliary classifier to the output maps and the training set of images to generate classification data; and
determining whether the machine learning process is trained based on the classification data.

17. The method of clause 16, wherein determining whether the machine learning process is trained comprises determining at least one loss based on the classification data and ground truth data corresponding to the training set of images.

18. The method of any of clauses 12-17, further comprising:
determining that the image data depicts the unauthentic object based on the intensity values; and
denying access to at least one function of the apparatus based on the determination.

19. The method of clause 18, further comprising transmitting a message to a device of a preauthorized user, wherein the message characterizes the denied access.

20. The method of any of clauses 12-19, wherein determining whether the image data depicts the unauthentic object based on the intensity values comprises:
determining a total intensity value based on the plurality of intensity values; and
comparing the total intensity value to a predetermined threshold.

21. A non-transitory, machine-readable storage medium storing instructions that, when executed by at least one processor, causes the at least one processor to perform operations that include:
obtaining image data;
applying a trained machine learning process to the image data to generate an output map comprising intensity values;
determining whether the image data depicts the unauthentic object based on the intensity values; and
generating, based on the determination, output data characterizing whether the image data depicts the unauthentic object.

22. The non-transitory, machine-readable storage medium of clause 21, wherein the trained machine learning process comprises establishing a convolutional neural network.

23. The non-transitory, machine-readable storage medium of clause 22, wherein the convolutional neural network comprises a plurality of down sampling layers, a plurality of up sampling layers, and a joint spatial and channel attention layer following each of the plurality of down sampling layers and each of the plurality of up sampling layers.

24. The non-transitory, machine-readable storage medium of clause 23 wherein each of the plurality of up sampling layers is configured to receive an output from a corresponding one of the plurality of down sampling layers and an output from a preceding one of the joint spatial and channel attention layers.

25. The non-transitory, machine-readable storage medium of any of clauses 21-24, wherein the operations further comprise:
obtaining a training set of images;
applying the machine learning process to the training set of images to generate training output maps;

applying an auxiliary classifier to the output maps and the training set of images to generate classification data; and determining whether the machine learning process is trained based on the classification data.

26. The non-transitory, machine-readable storage medium of clause 25, wherein determining whether the machine learning process is trained comprises determining at least one loss based on the classification data and ground truth data corresponding to the training set of images.

27. The non-transitory, machine-readable storage medium of any of clauses 19-26, wherein the operations further comprise:
determining that the image data depicts the unauthentic object based on the intensity values; and
denying access to at least one function of the apparatus based on the determination.

28. The non-transitory, machine-readable storage medium of clause 27, wherein the operations further comprise transmitting a message to a device of a preauthorized user, wherein the message characterizes the denied access.

29. The non-transitory, machine-readable storage medium of clause any of clauses 19-28, wherein determining whether the image data depicts the unauthentic object based on the intensity values comprises:
determining a total intensity value based on the plurality of intensity values; and
comparing the total intensity value to a predetermined threshold.

30. An image capture device comprising:
a means for obtaining image data;
a means for applying a trained machine learning process to the image data to generate an output map comprising intensity values;
a means for determining whether the image data depicts an unauthentic object based on the intensity values; and
a means for generating, based on the determination, output data characterizing whether the image data depicts the unauthentic object.

31. The image capture device of clause 30, wherein the trained machine learning process comprises establishing a convolutional neural network.

32. The image capture device of clause 31, wherein the convolutional neural network comprises a plurality of down sampling layers, a plurality of up sampling layers, and a joint spatial and channel attention layer following each of the plurality of down sampling layers and each of the plurality of up sampling layers.

33. The image capture device of clause 32, wherein each of the plurality of up sampling layers is configured to receive an output from a corresponding one of the plurality of down sampling layers and an output from a preceding one of the joint spatial and channel attention layers.

34. The image capture device of any of clauses 30-33, further comprising:
a means for obtaining a training set of images;
a means for applying the machine learning process to the training set of images to generate training output maps;
a means for applying an auxiliary classifier to the output maps and the training set of images to generate classification data; and
a means for determining whether the machine learning process is trained based on the classification data.

35. The image capture device of clause 34, wherein the means for determining whether the machine learning process is trained comprises a means for determining at least one loss based on the classification data and ground truth data corresponding to the training set of images.

36. The image capture device of any of clauses 30-35, wherein the operations further comprise:
determining that the image data depicts the unauthentic object based on the intensity values; and
denying access to at least one function of the apparatus based on the determination.

37. The image capture device of clause 36, wherein the operations further comprise transmitting a message to a device of a preauthorized user, wherein the message characterizes the denied access 38. The image capture device of any of clauses 30-37, wherein the means for determining whether the image data depicts the unauthentic object based on the intensity values comprises:
a means for determining a total intensity value based on the plurality of intensity values; and
a means for comparing the total intensity value to a predetermined threshold.

Although the methods described above are with reference to the illustrated flowcharts, many other ways of performing the acts associated with the methods may be used. For example, the order of some operations may be changed, and some embodiments may omit one or more of the operations described and/or include additional operations.

Further, although the exemplary embodiments described herein are, at times, described with respect to an image capture device, the machine learning processes, as well as the training of those machine learning processes, may be implemented by one or more suitable devices. For example, in some examples, an image capture device may capture an image (e.g., an image that includes a person's face), and may transmit the image to a distributed or cloud computing system. The distributed or cloud computing system may apply the trained machine learning processes described herein to determine whether the image includes an unauthorized object, and may transmit data (e.g., a message) to the image capture device, or any other suitable device (e.g., a user's cellphone) identifying whether the image includes an unauthorized object.

Additionally, the methods and system described herein may be at least partially embodied in the form of computer-implemented processes and apparatus for practicing those processes. The disclosed methods may also be at least partially embodied in the form of tangible, non-transitory machine-readable storage media encoded with computer program code. For example, the methods may be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, computer program code segments configure the processor to create specific logic circuits. The methods may alternatively be at least partially embodied in application specific integrated circuits for performing the methods.

We claim:

1. An apparatus comprising:
  a non-transitory, machine-readable storage medium storing instructions; and
  at least one processor coupled to the non-transitory, machine-readable storage medium, the at least one processor being configured to:
    obtain image data;
    apply a trained machine learning process to the image data and, based on the application of the trained machine learning process to the image data, generate an output map comprising a plurality of intensity values;
    determine a total intensity value based on the plurality of intensity values;
    determine whether the image data depicts an unauthentic object based on the total intensity value; and
    generate, based on the determination, output data characterizing whether the image data depicts the unauthentic object.

2. The apparatus of claim 1, wherein the trained machine learning process comprises establishing a convolutional neural network.

3. The apparatus of claim 2, wherein the convolutional neural network comprises a plurality of down sampling layers, a plurality of up sampling layers, and a joint spatial and channel attention layer following each of the plurality of down sampling layers and each of the plurality of up sampling layers.

4. The apparatus of claim 3, wherein each of the plurality of up sampling layers is configured to receive an output from a corresponding one of the plurality of down sampling layers and an output from a preceding one of the joint spatial and channel attention layers.

5. The apparatus of claim 1, wherein the at least one processor is configured to:
  determine that the image data depicts the unauthentic object based on the intensity values; and
  deny access to at least one function of the apparatus based on the determination.

6. The apparatus of claim 5, wherein the at least one processor is further configured to transmit a message to a device of a preauthorized user, wherein the message characterizes the denied access.

7. The apparatus of claim 1, wherein the at least one processor is further configured to:
  compare the total intensity value to a predetermined threshold; and
  determine whether the image data depicts the unauthentic object based on the comparison.

8. The apparatus of claim 1 comprising a camera configured to capture the image data.

9. The apparatus of claim 1 comprising a display configured to display the image data.

10. A method comprising:
  obtaining image data;
  applying a trained machine learning process to the image data and, based on the application of the trained machine learning process to the image data, generate an output map comprising intensity values;
  determining a total intensity value based on the plurality of intensity value;
  determining whether the image data depicts an unauthentic object based on the total intensity value; and
  generating, based on the determination, output data characterizing whether the image data depicts the unauthentic object.

11. The method of claim 10, wherein the trained machine learning process comprises establishing a convolutional neural network.

12. The method of claim 11, wherein the convolutional neural network comprises a plurality of down sampling layers, a plurality of up sampling layers, and a joint spatial and channel attention layer following each of the plurality of down sampling layers and each of the plurality of up sampling layers.

13. The method of claim 12, wherein each of the plurality of up sampling layers is configured to receive an output from a corresponding one of the plurality of down sampling layers and an output from a preceding one of the joint spatial and channel attention layers.

14. The method of claim 10, further comprising:
  determining that the image data depicts the unauthentic object based on the intensity values; and
  denying access to at least one function of the apparatus based on the determination.

15. The method of claim 14, further comprising transmitting a message to a device of a preauthorized user, wherein the message characterizes the denied access.

16. The method of claim 10, further comprising:
  comparing the total intensity value to a predetermined threshold; and
  determining whether the image data depicts the unauthentic object based on the comparison.

17. A non-transitory, machine-readable storage medium storing instructions that, when executed by at least one processor, causes the at least one processor to perform operations that include:
  obtaining image data;
  applying a trained machine learning process to the image data and, based on the application of the trained machine learning process to the image data, generate an output map comprising intensity values;
  determining a total intensity value based on the plurality of intensity value;
  determining whether the image data depicts the unauthentic object based on the total intensity value; and
  generating, based on the determination, output data characterizing whether the image data depicts the unauthentic object.

18. The non-transitory, machine-readable storage medium of claim 17, wherein the trained machine learning process comprises establishing a convolutional neural network.

19. The non-transitory, machine-readable storage medium of claim 18, wherein the convolutional neural network comprises a plurality of down sampling layers, a plurality of up sampling layers, and a joint spatial and channel attention layer following each of the plurality of down sampling layers and each of the plurality of up sampling layers.

20. The non-transitory, machine-readable storage medium of claim 19, wherein each of the plurality of up sampling layers is configured to receive an output from a corresponding one of the plurality of down sampling layers and an output from a preceding one of the joint spatial and channel attention layers.

* * * * *